Dec. 23, 1969 E. C. SCHROM 3,486,062
ELECTROHYDRAULIC SHOCK-WAVE GENERATING APPARATUS WITH
DIRECTING AND SHAPING MEANS
Filed Jan. 13, 1969 4 Sheets-Sheet 1

Inventor:
Edward C. Schrom,
by Richard A. Speer
His Attorney.

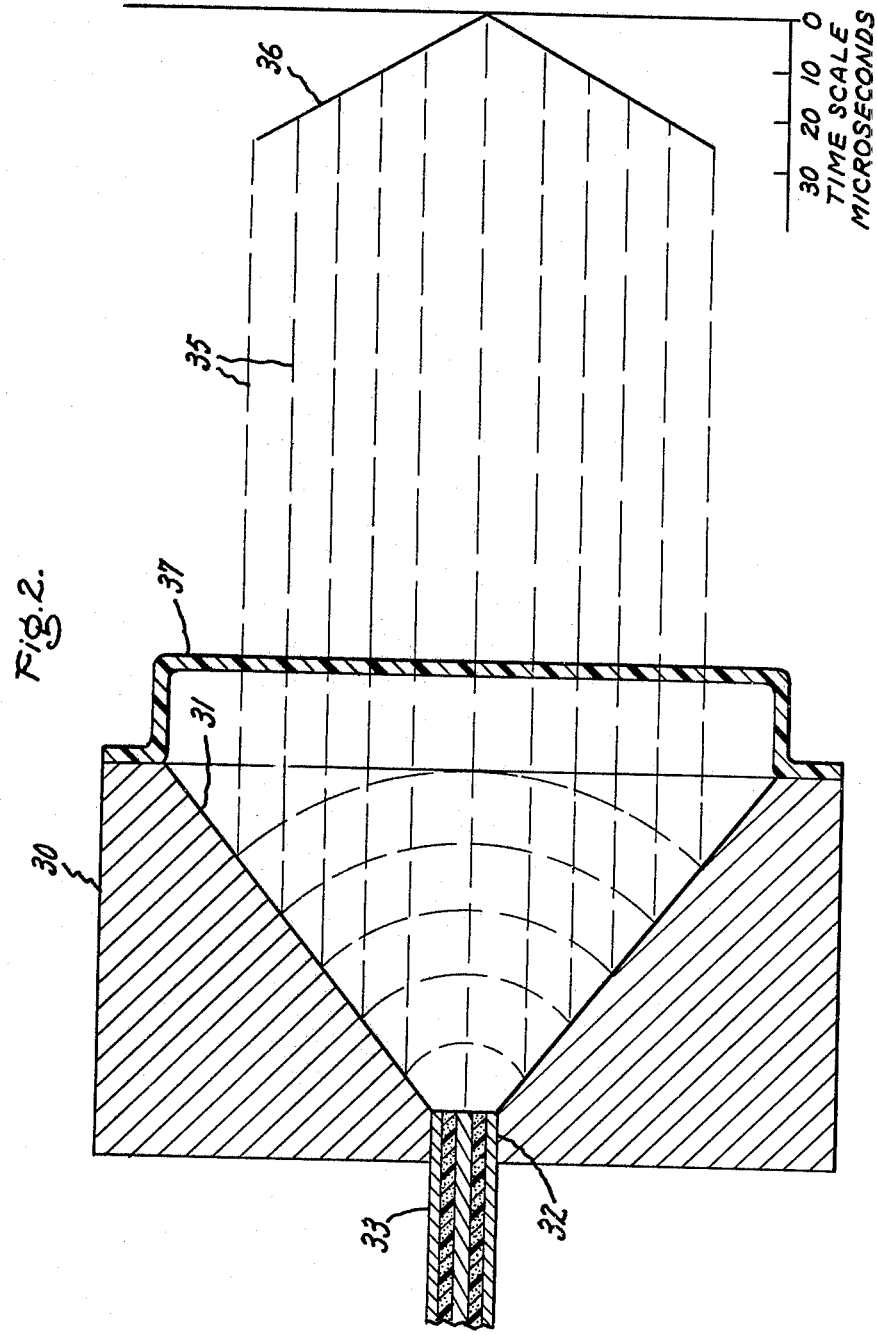

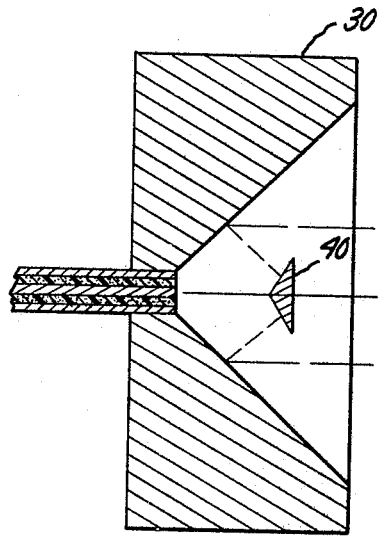
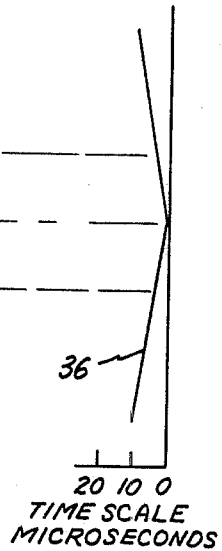
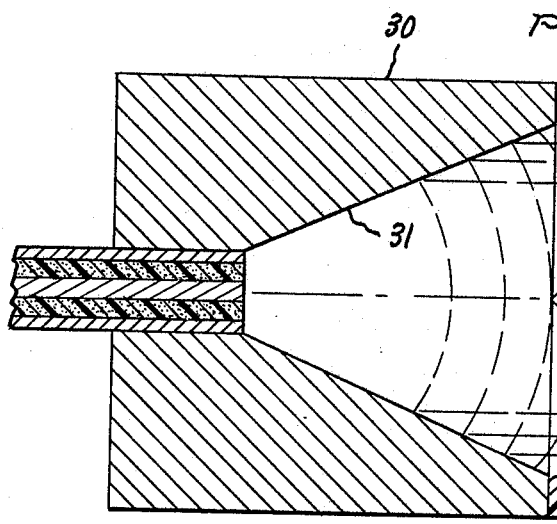
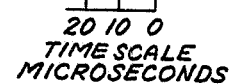

Inventor:
Edward C. Schrom,
by John N. Davis
His Attorney.

United States Patent Office
3,486,062
Patented Dec. 23, 1969

3,486,062
ELECTROHYDRAULIC SHOCK-WAVE GENERATING APPARATUS WITH DIRECTING AND SHAPING MEANS
Edward C. Schrom, Schenectady, N.Y., assignor to General Electric Company, a corporation of New York
Continuation-in-part of application Ser. No. 546,430, Apr. 29, 1966. This application Jan. 13, 1969, Ser. No. 814,478
Int. Cl. H01j 17/04, 61/06
U.S. Cl. 313—217     10 Claims

ABSTRACT OF THE DISCLOSURE

An electrohydraulic shock-wave generating apparatus is disclosed wherein means are incorporated for directing and shaping the shock-wave to more effectively make use of the energy therein. These means involve the use of members having directing, reflecting and collimating functions with respect to the shock-wave.

---

This application is a continuation-in-part of Ser. No. 546,430 filed on Apr. 29, 1966 in the name of the present inventor and assigned to the present assignee, and now abandoned.

The disclosure of U.S. Patent 3,354,344, issued in the name of the present inventor on Nov. 21, 1967 and assigned to the present assignee is hereby incorporated by reference in the present disclosure.

Electrohydraulics is a technology which is concerned broadly with the creation or generation of shock waves in liquid media by means of electric arc discharge in the liquid and therefore relates to the apparatus and methods for creating and utilizing the shock waves. The technology may, in a broad sense, be viewed as one in which electrical energy is converted to physical or mechanical energy, the latter form of energy being then directly applicable to various types of manufacturing and process operations. The physical energy takes the form of a shock wave or step pressure gradient that is transmitted from its point of origin, the electric arc of a submerged electrode, through the fluid surrounding the electrode. The energy of the wave is great enough to effect deformation of heavy gauge metals and is adaptable to such diverse applications as metal forming, rock crushing, cleaning, and material compaction, for example. Since many of these types of operations require fast, repeated discharges and in view of the fact that the electrode is immersed in the work liquid, it is apparent that the electrode must be capable of withstanding demanding operating conditions for long discharge cycles. Furthermore, in many applications, only a portion of the total shock wave energy is applied to the area or surface which is desired to be impacted, the balance being dissipated without doing useful work and hence wasted.

It is an object of this invention to provide an improved discharge apparatus for electrohydraulic applications in which the generated shock wave can be directed in a predetermined direction and in which the shape of the shock wave may be modified.

Other objects of this invention will be in part obvious and in part explained by reference to the accompanying specification and drawings.

In the drawings:

FIGURE 2 is a sectional view through a modification of the invention;

FIGURE 3 is a sectional view through a yet further modification of the invention;

FIGURE 4 is a sectional view through another modification of the invention;

Generally, the electrode structure employed in the apparatus of this invention comprises inner and outer electrodes which are separated by appropriate electric insulating means so the arcing can occur between them. One electrode, of course, is connected to a high voltage power source whereas the other is connected to electric ground. The inner electrode has an arcing surface on one end and this surface is partially covered by an electric insulator which separates it from the outer electrode. The outer electrode is concentrically mounted with respect to the inner electrode and has an arcing surface positioned operatively adjacent the arcing surface of the inner electrode. The mounting of the outer electrode on the inner electrode is such that the electric insulator covering a portion of the inner electrode arcing surface is placed in mechanical compression thereby significantly increasing the operational life span of the composite electrode.

Figure 1:
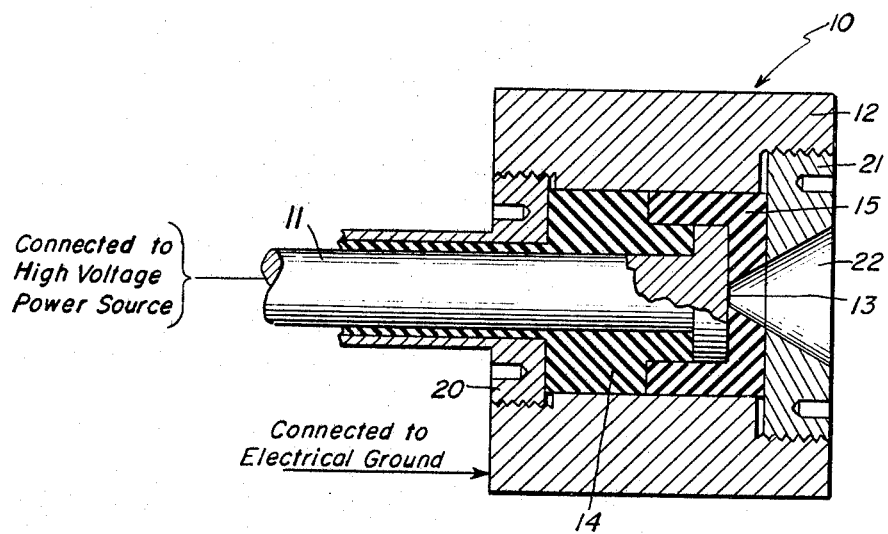
FIGURE 1 is a sectional view through an improved electrode construction according to one embodiment of this invention.

More particularly and with reference to FIG. 1 of the drawings wherein one embodiment of the invention is illustrated, the numeral 10 indicates the composite electrode, which comprises a high voltage inner electrode 11 and an outer electrode 12 which is mounted coaxially with respect thereto. The inner electrode 11 is connected at one end to a suitable high voltage power source and has at its other end an arcing surface 13. The high voltage power supply is normally a capacitor bank capable of being discharged as a single impulse or repetitively as disclosed, for example, by FIG. 3 of the previously referenced patent. It is surrounded by insulator means 14 and a separate electric insulator 15 which extends around the arcing end of the inner electrode and covers a portion of the arcing surface 13. It is not important that the electric insulator 15 extend around the side edges of the arcing end of the inner electrode since a ring-type insulator suitably backed would suffice as well. In connection with the construction described, it should be pointed out that either the inner or the outer electrode can be connected to the source of high voltage power, since arcing can be effected in either polarity.

The outer electrode 12 is, as already mentioned, disposed coaxially with respect to inner electrode 11 and is mounted on the inner electrode by means of an externally threaded retaining ring 20. Obviously, other acceptable mechanical means can be used to secure the main body of outer electrode 12 to the inner electrode of the composite.

Mounted within the outer end of outer electrode 12 is a removable insert 21 which has an annular opening defined by arcing surface 22. The removable insert 21 is shown as being threadably engaged within the main body of outer electrode 12, but, once again, it is apparent that other acceptable mechanical means may be used to removably mount insert 21 within the main body of outer electrode 12. It will be noted that the annulus extending through electrical insulator 15 is complemented by the annulus extending through removable insert 21 and defined by arching surface 22 so that the shock wave created by arcing between surfaces 13 and 22 will be directed outwardly away from the insulator. It is apparent that the electrical insulator 15 and the removable insert 21 define complementing annuli that together form a frustum of a cone, although this configuration is given only by way of example. That is, shapes other than conical, such as an elliptical section, might be preferred under certain operating conditions. In any event, surface 22 may be broadly stated as having a divergent configuration in the zone extending outwardly from the source of the shock wave.

Ruggedness imparting extended operational life is obtained by the construction just described by virtue of the fact that a portion of the electrode arcing surface 13 is overlaid or covered by the electrical insulator 15 which is placed in compression and therefore held tightly against the inner surface of insert 21 and the arcing surface 13. The shock waves generated by arcing between the appropriate surfaces 13 and 22 therefore cannot result in splitting or cleaving between the inner and outer electrodes and the separating insulator, as has occurred in prior electrode constructions. Additionally, should it be desired to change the angle of shock wave divergence away from the point of arcing, this can be accomplished merely by removing insert 21 and the insulator 15 and replacing them with other parts having greater or lesser degrees of divergence. Replacement of insert 21 and insulator 15 with corresponding parts of different shape can also be effected to alter the type of shock wave propagated.

Another embodiment of the invention is illustrated in FIG. 2 wherein a director member 30 is provided with a conical recess having a divergent surface 31 and an opening 32 through which an electrode structure 33 extends. While any suitable concentric electrode may be employed, one such as illustrated in FIG. 1 of the previously referenced patent is preferred. It is important that the tip of the electrode from which the shock wave originates be located approximately in the plane of the truncation of the conical surface, as shown, for maximum efficiency. The manner in which the surface 31 directs the shock wave during propagation is schematically shown by lines 35 and the arrival times of the various portions of the shock wave at a given spaced location is shown by the idealized wave front form at 36 in terms of the time scale in microseconds. If desired, a diaphragm 37 composed of an elastomeric material may be employed as shown. Such a diaphragm may be desirable in circumstances where it is advantageous to employ a different liquid as the working fluid from that in which the arc discharge is produced or in situations where the diaphragm is placed directly against the work piece without a second liquid.

As shown in FIG. 3, the wave front form may be further modified by providing the director member 30 with a conical deflector member 40 which is supported coaxially in the space defined by the conical surface 31 and having its apex directed toward the electrode 33 and spaced therefrom. By changing the angular relationships of the conical surfaces to each other, the shape of the wave front 36 may be altered. Obviously deflector 40 may be formed from shapes other than a cone such as hemispheric, for example.

A further modification of the wave front may be accomplished by the apparatus illustrated in FIG. 4. Again, as in FIGS. 2 and 3 a director 30 is provided having a conical surface 31 and, as in FIG. 2, a diaphragm 37. A conical deflector member 41 is supported by the diaphragm on its inner surface coaxially with respect to conical surface 31, as shown. Member 41 may be formed as an integral part of diaphragm 37 during molding of the diaphragm 37 during molding of the diaphragm or may be a separate member attached thereto by an convenient means. As in the case of the apparatus shown in FIG. 3, the angular relationship between the conical surfaces may be selected to alter the geometry of the wave front as desired. Furthermore, while members 40 and 41 have been shown and described as having conical surfaces, it will be appreciated that the deflector members may have shapes other than cones, such as, for example, hemispheric or hemi-ovoid or the like.

Figure 5:
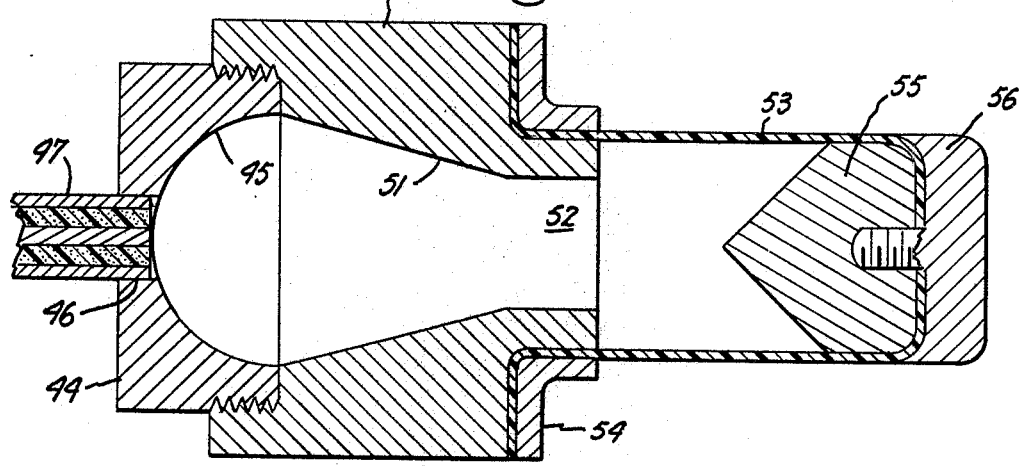
FIGURE 5 is a sectional view through a yet further modification of the invention.

A somewhat different modification of the invention is shown in FIG. 5 wherein a director member 44 is provided with a surface 45 which is hemispherical in form and is provided with an electrode port 46 and an electrode member 47, similar to electrode member 33 of FIG. 2. The working tip or spark gap of the electrode member 47 is preferably located at approximately where the hemispherical surface 45 would be located in the absence of the electrode port 46. A collimator member 50 is secured to the director member 44 by any convenient means such as the threaded connection shown, and is provided with a collimating inner surface 51 which is coaxial with the hemispheric surface 45 and the electrode member 47. A large proportion of the total energy in the form of a shock wave produced by the arc discharge of electrode member 47 is concentrated and delivered to and through the energy delivery port 52. It will be apparent to those skilled in the art that the basic combination may be employed in various ways. For example, as shown in FIG. 5 an elongated elastomeric tubular diaphragm 53 may be secured in place by a retainer member 54 which secures the diaphragm 53 to the collimator 50 by any convenient means in coaxial relationship to the electrode member 47, the director surface 45, the collimator 51 and the delivery port 52. A conical reflector member 55 is secured in the remote end of the diaphragm 53 by means of a retainer member 56 by means, for example, of a threaded connection as shown. This particular configuration has been found useful for expanding thin wall tubular metal members into configured split dies, not shown.

Figure 6:
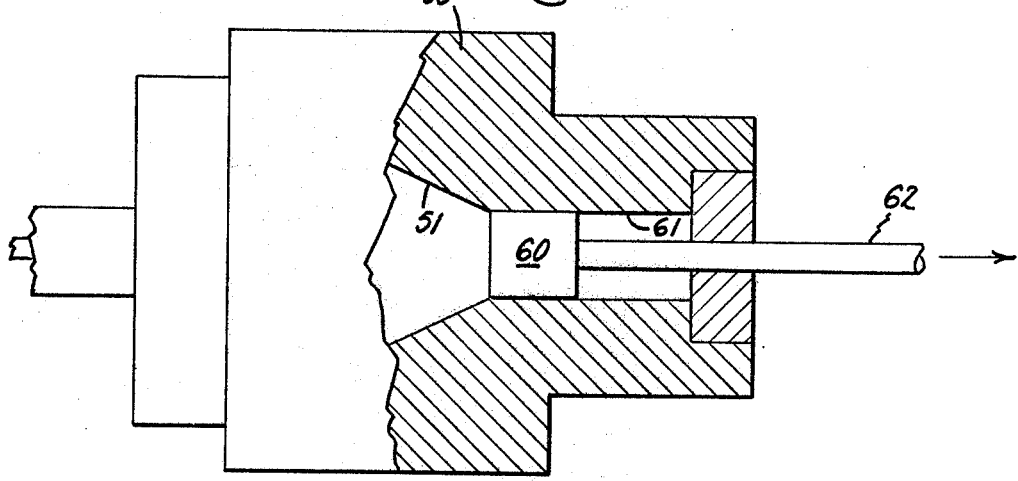
FIGURE 6 is a sectional view of a modification of the apparatus of FIGURE 5 with parts broken away.

The same basic combination has been used for producing very quick mechanical motion. In FIG. 6, the same structure of FIG. 5, with parts broken away is illustrated for operating a piston 60 in a cylindrical bore 61 to impart rapid axial motion to piston rod 62. Other useful means for using the energy will be readily apparent to those skilled in the art.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. In an electrode for use in electrohydraulic applications where a high voltage electric arc is discharged between inner and outer electrodes to generate a shock wave in a liquid medium surrounding the electrode, the improvement in electrode construction comprising an inner electrode having a substantially planar arcing surface on one end, an electrical insulator covering the arcing surface of the inner electrode except for a preselected area exposed by a shaped annulus extending through the insulator, and an outer electrode having an arcing surface defining an annulus complementing the annulus of the insulator so that generated shock waves are directionally controlled, said outer electrode being coaxially mounted with respect to the inner electrode in a manner such that that portion of said electrical insulator covering the arcing surface of the inner electrode is in mechanical compression.

2. An electrode as defined in claim 1 wherein the composite annulus formed by the insulator and the outer electrode arcing surface has the shape of a frustum of a cone.

3. An electrode as defined in claim 1 wherein the electrode arcing surface is provided by a removable insert in said outer electrode which places said electrical insulator in mechanical compression.

4. An electrohydraulic apparatus comprising a concentric electrode structure including an elongated rod-like inner electrode member, a tubular outer electrode member concentrically disposed to and substantially coextensive with said inner electrode, the annular space therebetween being provided with an electrical insulator, said electrode structure providing a working tip portion for electric arc discharge between said inner and outer electrode members, and means for directionally controlling shock waves produced by arc discharges between said electrodes comprising a surface immediately adjacent said working tip which is a divergent surface of revolution about an axis which is substantially coincident to the axis of said electrode structure.

5. An electrohydraulic apparatus as set forth in claim 4 wherein said surface comprises a frustum of a cone.

6. An electrohydraulic apparatus as set forth in claim 4 wherein said surface comprises a hemispherical shape.

7. An electrohydraulic apparatus as set forth in claim 4 wherein means are provided for modifying the shape of said shock waves comprising a second divergent surface of revolution which is substantially coaxial with the axis of said electrode structure and axially displaced from said working tip.

8. An electrohydraulic apparatus as set forth in claim 7 wherein said second surface is a cone.

9. An electrohydraulic apparatus as set forth in claim 7 wherein said second surface is hemispheric.

10. An electrohydraulic apparatus as set forth in claim 4 wherein shock wave collimating means are provided comprising a convergent surface of revolution which is substantially coaxial with said electrode axis and is immediately adjacent said divergent surface and terminates at an energy delivery port having a reduced transverse dimension.

References Cited

UNITED STATES PATENTS

| 2,870,376 | 1/1959 | Tognola | 315—241 X |
| 2,922,066 | 1/1960 | Stevens et al. | 313—209 X |
| 2,979,640 | 4/1961 | Edmonson | 313—231 |
| 3,087,092 | 4/1963 | Lafferty | 313—306 X |
| 3,180,418 | 4/1965 | MacLeod | 204—157.1 |
| 3,356,897 | 12/1967 | Barr et al. | 315—238 X |
| 3,401,473 | 9/1968 | Schrom | 313—325 X |

JOHN W. HUCKERT, Primary Examiner
ANDREW J. JAMES, Assistant Examiner

U.S. Cl. X.R.
204—157.1; 313—231, 233, 307, 325, 326